US011418106B2

(12) United States Patent
Tian et al.

(10) Patent No.: US 11,418,106 B2
(45) Date of Patent: Aug. 16, 2022

(54) APPARATUS FOR CONVERSION BETWEEN AC POWER AND DC POWER

(71) Applicant: ABB Schweiz AG, Baden (CH)

(72) Inventors: Kai Tian, Hebei (CN); Tinho Li, Hong Kong (CN); Kuenfaat Yuen, Hong Kong (CN); Mei Liang, Beijing (CN)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/212,669

(22) Filed: Mar. 25, 2021

(65) Prior Publication Data

US 2021/0211037 A1 Jul. 8, 2021

Related U.S. Application Data

(63) Continuation of application No. PCT/CN2019/094752, filed on Jul. 4, 2019.

(51) Int. Cl.

*H02M 1/12* (2006.01)
*H02M 7/219* (2006.01)
*H02M 7/487* (2007.01)

(52) U.S. Cl.

CPC ........... *H02M 1/126* (2013.01); *H02M 7/219* (2013.01); *H02M 1/123* (2021.05); *H02M 7/487* (2013.01)

(58) Field of Classification Search

CPC ...... H02M 1/123; H02M 1/126; H02M 7/219; H02M 7/487

See application file for complete search history.

(56) References Cited

U.S. PATENT DOCUMENTS 7,518,891 B2 4/2009 Wei et al.
9,203,298 B2 * 12/2015 Wang ...................... H02M 7/06

(Continued)

FOREIGN PATENT DOCUMENTS

CN 101884158 A 11/2010
CN 102405588 A 4/2012

(Continued)

OTHER PUBLICATIONS

Intellectual Property Office of the P.R. China, International Search Report & Written Opinion issued in corresponding Application No. PCT/CN2019/094752, dated Oct. 8, 2019, 9 pp.

(Continued)

*Primary Examiner* — Jue Zhang

(74) *Attorney, Agent, or Firm* — Greenberg Traurig, LLP

(57) ABSTRACT

An apparatus for conversion between AC power and DC power. The apparatus includes: a first power conversion circuit having a first AC side and a DC side, at least one second power conversion circuit each having a second AC side and sharing the DC side with the first power conversion circuit, and at least one choke having a first terminal, a second terminal and at least one third terminal, wherein: the first terminal is arranged to be electrically coupled to a phase of the AC power, and the second terminal and the at least one third terminal are electrically coupled to respective same phases of the first AC side of the first power conversion circuit and the second AC side of the at least one second power conversion circuit. Moreover, the choke includes: a first common-mode choke and a first differential-mode choke, wherein: the first common-mode choke and the first differential-mode choke are electrically coupled in series via a first group of coil ends of the first common-mode choke and a first group of coil ends of the first differential-mode choke, and a second group of coil ends of one of the first (Continued)

common-mode choke and the first differential-mode choke are electrically coupled to the first terminal of the choke, and a second group of coil ends of the other are respectively electrically coupled to the second terminal and the at least one third terminal of the choke. The first common-mode choke can help provide high inductance to the high-frequency components of the common-mode current, which flows from the AC power source, since the impedance of the common-mode choke and the differential-mode choke depends on frequency on the same scale as inductance. The advantages of using the common-mode choke is that it provides twice the inductance of separate inductor design due to the coupling effect. Therefore it filters the common-mode current more effectively on the inductance size can be reduced for a given current ripple requirement.

20 Claims, 8 Drawing Sheets

(56) References Cited

U.S. PATENT DOCUMENTS

| | | | | |
|---|---|---|---|---|
| 9,680,395 | B2 | 6/2017 | Torrico-Bascope | |
| 2007/0030707 | A1 | 2/2007 | Wei et al. | |
| 2011/0032737 | A1* | 2/2011 | Rincent ................... | H02M 1/44<br>363/64 |
| 2011/0050135 | A1 | 3/2011 | Higuchi et al. | |
| 2011/0286249 | A1 | 11/2011 | Torrico-Bascope | |
| 2012/0032651 | A1 | 2/2012 | Torrico-Bascope | |
| 2016/0118910 | A1 | 4/2016 | Torrico-Bascope | |
| 2017/0288575 | A1 | 10/2017 | Kitada | |

FOREIGN PATENT DOCUMENTS

| | | | |
|---|---|---|---|
| CN | 104333248 | A | 2/2015 |
| CN | 104638891 | A | 5/2015 |
| CN | 105247776 | A | 1/2016 |
| CN | 106411121 | A | 2/2017 |
| CN | 107204720 | A | 9/2017 |
| CN | 107404218 | A | 11/2017 |
| CN | 107888061 | A | 4/2018 |
| CN | 207561736 | U | 7/2018 |
| EP | 2665170 | A1 | 11/2013 |

OTHER PUBLICATIONS

Intellectual Property Office of the P.R. China, International Search Report issued in corresponding Application No. PCT/CN2018/107982, dated Jul. 1, 2019, 3 pp.

Yuelin et al., "Design and Implementation of a 125kW T-NPC PV Inverter," PCIM Asia 2015, Shanghai, China, Jun. 24-26, 2015, 8 pp.

Ortmann, et al.; "Multilevel Multistate Switching Cells PEBBs as the Basis for the Implementation of Advanced Rectifiers"; Applied Power Electronics Conference and Exposition (APEC), 2013 Twenty-Eighth Annual IEEE; dated Mar. 17, 2013; pp. 1871-1877.

Extended European Search Report, issued by the European Patent Office, regarding corresponding patent application Serial No. EP 19866912.9; dated May 17, 2022; 8 pages.

China First Office Action, issued by the National Intellectual Property Administration, regarding corresponding patent application Serial No. CN 2022042802704030; dated May 6, 2022; 9 pages (with English Translation).

* cited by examiner

APPARATUS FOR CONVERSION BETWEEN AC POWER AND DC POWER

TECHNICAL FIELD

The invention relates to conversion between AC power and DC power, and more particularly to AC sides of power conversion circuits are arranged for operation in parallel.

BACKGROUND ART

High efficiency and low cost power conversion between AC power and DC power can be achieved with power converter having a plurality of power conversion circuits with their AC sides coupled in parallel. By using proper pulse width-modulation schemes and interleaving angle, the interleaving on harmonic currents and voltages on the AC sides in parallel has benefit to reduce AC passive components. For example, interleaved Vienna topology is one of the promising AC-DC topologies through power converter paralleling. Patent US20120032651A1 discloses a solution for power factor correction of three-phase power convector, involving connecting controllable bi-directional switches to legs of autotransformer for forming a multi-stage switching cell. In particular, it involves connecting each phase of a three-phase input of a power converter to a midpoint across an autotransformer. The connection is provided over a controllable bi-direction switch. The diodes are connected to positive and negative side of the power converter. The controllable bi-directional switches are connected to legs of autotransformer for forming a multi-stage switching cell. Such solution uses the autotransformer to suppress current ripple, making it lower cost and less losses compared with other conventional topologies. The current ripples consists of the component flowing to the grid and the different current between the interleaved legs (or called circulating current in some literatures). The different current between the interleaved legs are suppressed by the autotransformer.

BRIEF SUMMARY OF THE INVENTION

However, the solution according to patent US20120032651A1 has at least two disadvantages. One is that the boost inductor $L_a$, $L_b$, $L_c$ has no contribution on the differential-mode current suppression. The other is that the parasitic capacitance of the autotransformer will cause spikes in the leg current and deteriorate the EMI performance. In order to solve at least one of the problems, it is therefore an objective of the invention to provide an apparatus for conversion between AC power and DC power. The apparatus includes: a first power conversion circuit having a first AC side and a DC side, at least one second power conversion circuit each having a second AC side and sharing the DC side with the first power conversion circuit, and at least one choke having a first terminal, a second terminal and at least one third terminal, wherein: the first terminal is arranged to be electrically coupled to a phase of the AC power, and the second terminal and the at least one third terminal are electrically coupled to respective same phases of the first AC side of the first power conversion circuit and the second AC side of the at least one second power conversion circuit. Moreover, the choke includes: a first common-mode choke and a first differential-mode choke, wherein: the first common-mode choke and the first differential-mode choke are electrically coupled in series via a first group of coil ends of the first common-mode choke and a first group of coil ends of the first differential-mode choke, and a second group of coil ends of one of the first common-mode choke and the first differential-mode choke are electrically coupled to the first terminal of the choke, and a second group of coil ends of the other are respectively electrically coupled to the second terminal and the at least one third terminal of the choke.

The first common-mode choke can help provide high inductance to the high-frequency components of the common-mode current, which flows from the AC power source, since the impedance of the common-mode choke and the differential-mode choke depends on frequency on the same scale as inductance. The advantages of using the common-mode choke is that it provides twice the inductance of separate inductor design due to the coupling effect. Therefore it filters the common-mode current more effectively or the inductance size can be reduced for a given current ripple requirement.

Preferably, the first common-mode choke has a leakage flux. The common-mode choke, in principle, does not provide inductance towards the differential-mode current between the interleaved legs due to the flux cancellation effect. However, the leakage inductance is acting in suppressing the differential-mode current between the interleaved legs together with the differential-mode choke. The leakage inductance of the common-mode choke help reduce the undesired differential-mode current ripple and spikes.

Preferably, the first common-mode choke has a first parasitic capacitive element and the first differential-mode choke has a second parasitic capacitive element. The leakage inductance and capacitance are acting in suppressing the differential-mode current between the interleaved legs together with the differential-mode choke. The leakage inductance and capacitance of the common-mode choke can help reduce the undesired differential-mode current ripple and spikes.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1A:
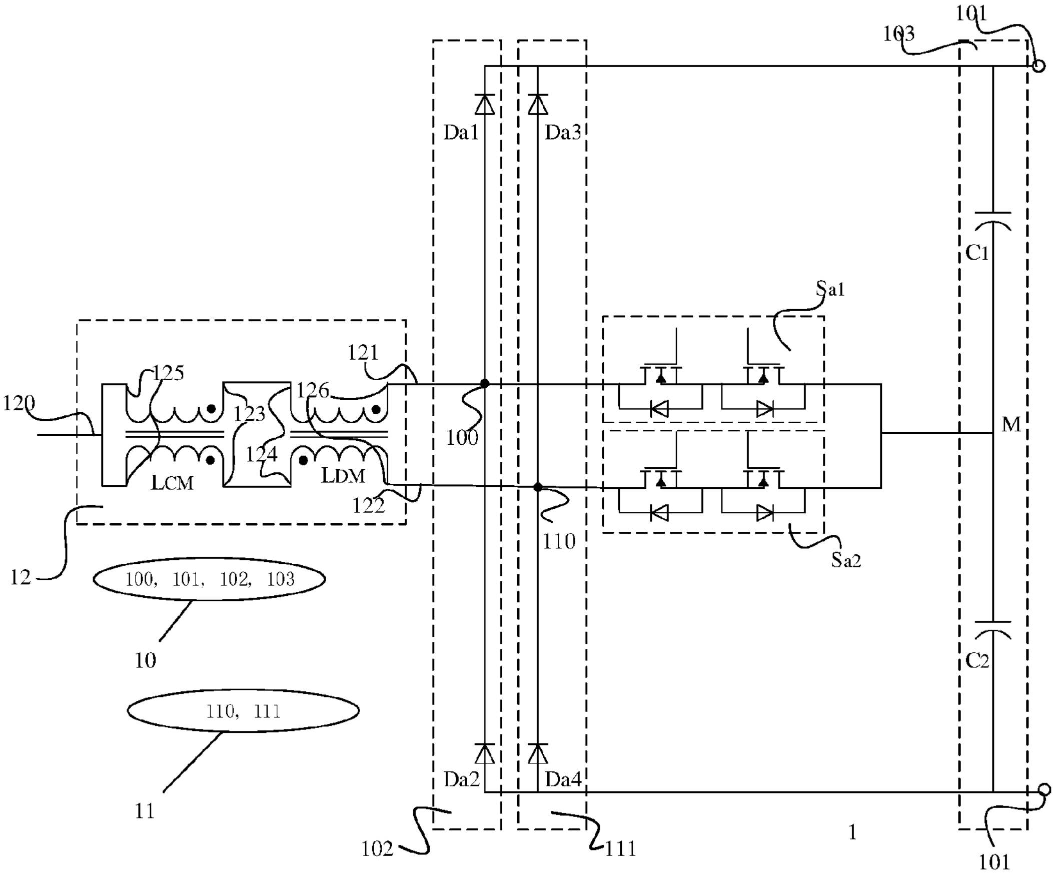
FIG. 1A shows an embodiment used for single phase AC power source according to present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word “may” is used throughout this application in a permissive sense (i.e., having the potential to, being able to), not a mandatory sense (i.e., must).” The term “include”, and derivations thereof, mean “including, but not limited to”. The term “connected” means “directly or indirectly connected”, and the term “coupled” means “directly or indirectly connected”.

Figure 1B:
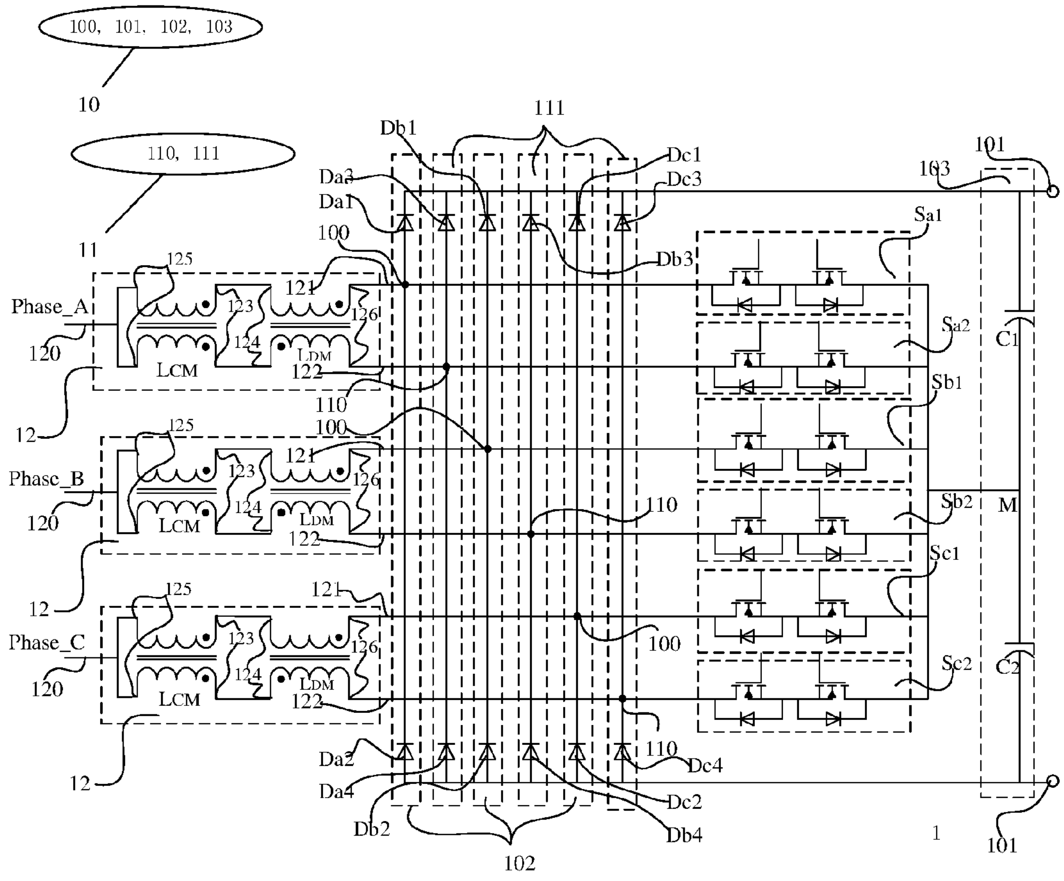
FIG. 1B shows an embodiment used for three phase AC power source according to present invention.

FIGS. 1A and 1B illustrate apparatuses for conversion between AC power and DC power according to an embodiment of present invention. FIG. 1A shows the embodiment used for single phase AC power source, and FIG. 1B shows the embodiment used for three phase AC power source. As shown in FIGS. 1A and 1B, the apparatus 1 can receive AC power at its AC side from an AC power source and convert the received AC power into DC power at its DC side. The apparatus 1 includes a first power conversion circuit 10, at least one second power conversion circuit 11, at least one choke 12.

The first power conversion circuit 10 can use an AC to DC power conversion topology having a first AC side 100 and a DC side 101. For example, the first power conversion circuit 10 may have a first rectifier 102 and a capacitor bank 103. The first rectifier 102 is coupled to the first AC side 100 and the capacitor bank 103 is coupled to the DC side 101. The first rectifier 102 may rectify a first AC power supplied from the AC power source AC, which in turn flows to the DC side 101 via the capacitor bank 103. As shown in FIG. 1A, the first rectifier 102 includes a plurality of 2-terminal power semiconductor devices. A 2-terminal power semiconductor device has state dependent on external power circuit to which it is connected, for example power diodes Da1-Da2, arranged in a half bridge configuration. The mid-point for the diodes Da1-Da2 is electrically coupled to one of the single phase terminals of the first AC side 100 of the first power conversion circuit 10. The legs consisting diodes Da1-Da2 and diodes Da3-Da4 are interleaved in operation under the controlling the controllable bi-directional switch $S_{a1}$ and the controllable bi-directional switch $S_{a2}$ by a controller. As shown in FIG. 1B, the first rectifier 102 includes a plurality of diodes Da1-Da2, Db1-Db2 and Dc1-Dc2, arranged in a three-phase full bridge configuration. The mid-points respectively for the diodes Da1-Da2, diodes Db1-Db2 and diodes Dc1-Dc2 are electrically coupled to phase A, phase B and phase C of the first AC side 100 of the first power conversion circuit 10.

The at least one second power conversion circuit 11 each can use an AC to DC power conversion topology having a second AC side 110 and sharing the DC side 101 with the first power conversion circuit 10. In this embodiment, the number of the at least one second power conversion circuit 11 counts one. For example, the second power conversion circuit 11 may have a second rectifier 111 is coupled to the second AC side 110, which may rectify a second AC power supplied from the AC power source AC, which in turn flows to the DC side 101 via the capacitor bank 103. As shown in FIG. 1A, the second rectifier 111 includes a plurality of diodes Da3-Da4, arranged in a half bridge configuration. The mid-point for the diodes Da3-Da4 is electrically coupled to the other of the single phase terminals of the first AC side 100 of the first power conversion circuit 10. As shown in FIG. 1B, the second rectifier 111 includes a plurality of diodes Da3-Da4. Db3-Db4 and Dc3-Dc4, arranged in a three-phase full bridge configuration. The mid-points respectively for the diodes Da3-Da4, diodes Db3-Db4 and diodes Dc3-Dc4 are electrically coupled to phase A, phase B and phase C of the second AC side 110 of the second power conversion circuit 11.

In this embodiment, the capacitor bank 103 has a first capacitive element $C_1$ and a second capacitive element $C_2$ electrically connected in series at a mid-point M. For each of the phases A, B, C, the apparatus 1 further includes: a group of controllable bi-directional switches, one of which is inserted between the second terminal 121 of the corresponding choke 12 and the mid-point M of capacitor bank 103 electrically connecting the same and the other of which is inserted between the third terminal 122 of the corresponding choke 12 and the mid-point M of capacitor bank 103 electrically connecting the same. For example, with respect to phase-A, the controllable bi-directional switch $S_{a1}$ is arranged between the second terminal 121 of the choke 12 for phase-A and the mid-point M of the capacitor bank 103, and the switch $S_{a1}$ electrically coupled to both of them; and the other controllable bi-directional switch $S_{a2}$ is arranged between the third terminal 122 of the choke 12 for phase-A and the mid-point M of the capacitor bank 103, and the switch $S_{a2}$ electrically coupled to both of them. The same holds true for phase B and phase C, except that for phase B it concerns with the counterparts as of the group of controllable bi-directional switches $S_{b1}$, $S_{b2}$ and the choke 12 for phase-B, and for phase C it concerns with the counterparts as of the group of controllable bi-directional switches $S_{c1}$, $S_{c2}$ and the choke 12 for phase-C. Modulation of the converter is the same as normal interleaved converter with phase shift between the two interleaved legs.

In the operation under controlling the controllable bi-directional switches $S_{a1}$ $S_{a2}$, $S_{b1}$, $S_{b2}$, $S_{c1}$, $S_{c2}$ by the controller, for phase A, the legs consisting diodes Da1-Da2 and diodes Da3-Da4 are interleaved; for phase B the legs consisting diodes Db1-Db2 and diodes Db3-Db4 are interleaved; and for phase C the legs consisting diodes Dc1-Dc2 and diodes Dc3-Dc4 are interleaved. Patent US20120032651A1 is incorporated here for reference for disclosing the different modes of operation setting of the controllable bi-directional switches $S_{a1}$ $S_{a2}$, $S_{b1}$, $S_{b2}$, $S_{c1}$, $S_{c2}$ for interleaving operation of the legs in the topology according to FIG. 1B and the different modes of operation setting of the controllable bi-directional switches $S_{a1}$ $S_{a2}$ may apply to the topology according to FIG. 1A.

The number of the at least one choke 12 depends on how many phases the AC power source has which supplies AC current to the apparatus 1. In the embodiment of FIG. 1B, the AC power source has three phases A, B, C, thus the number of the at least one choke 12 counts three. Namely, for each phase A, B, C, there is arranged a choke in the apparatus 1.

Each of the three chokes has a first terminal 120, a second terminal 121 and at least one third terminal 122. The number of the at least one third terminal 122 is associated with how many second power conversion circuit 11 the apparatus 1 uses. In this embodiment of FIG. 1A, the number of the at least one choke 12 counts one, and consequently a number of the at least one third terminal 122 counts one, as well.

The first terminal 120 of each of the three chokes 12 is arranged to be electrically coupled to a phase of the AC power, and the second terminal 121 and the third terminal 122 are electrically coupled to respective same phases of the first AC side 100 of the first power conversion circuit 10 and the second AC side 110 of the second power conversion circuit 11. As shown in FIG. 1A, the choke 12 has its first terminal 120 electrically coupled to one of the phase terminals of the AC power source, its second terminal 121 electrically coupled to the first AC side 100, and its third terminal 122 electrically coupled to the second AC side 110 of the second power conversion circuit 11. As shown in FIG. 1B, with respect to phase-A of the AC power source, one of the chokes 12 has its first terminal 120 coupled to the phase-A of the AC power source, its second terminal 121 electrically coupled to phase-A of the first AC side 100 of the first power conversion circuit 10, and its third terminal 122 electrically coupled to phase-A of the second AC side 110 of the second power conversion circuit 11; with respect to phase-B of the AC power source, one of the chokes 12 has its first terminal 120 coupled to the phase-B of the AC power source, and its second terminal 121 electrically coupled to phase-B of the first AC side 100 of the first power conversion circuit 10 and its third terminal 122 electrically coupled to phase-B of the second AC side 110 of the second power conversion circuit 11; with respect to phase-C of the AC power source, one of the chokes 12 has its first terminal 120 is electrically coupled to the phase-C of the AC power source, its second terminal 121 electrically coupled to phase-C of the first AC side 100 of the first power conversion circuit 10, and its third terminal 122 electrically coupled to phase-C of the second AC side 110 of the second power conversion circuit 11.

Each choke 12 includes a first common-mode choke $L_{CM}$ and a first differential-mode choke $L_{DM}$. The first common-mode chock $L_{CM}$ has a group of coils wound on a core, and the number of the coils depends on the number of the first power conversion circuit 10 and the second power conversion circuit 11. In this embodiment, the apparatus 1 has one first power conversion circuit 10 and one second power conversion circuit 11, and consequently the number of the coils counts two.

The first common-mode choke $L_{CM}$ and the first differential-mode choke $L_{DM}$ are electrically coupled in series via first ends 123 of the coils of the first common-mode choke $L_{CM}$ and first ends 124 of the coil of the first differential-mode choke $L_{DM}$.

Second ends 125 of the coils of the first common-mode choke $L_{CM}$ are electrically coupled to the first terminal 120 of the choke 12, and second ends 126 of the coils of the first differential-mode choke $L_{DM}$ are respectively electrically coupled to the second terminal 121 and the third terminal 122 of the choke 12. As an alternative, second ends of the coils of the first common-mode choke $L_{CM}$ are respectively electrically coupled to the second terminal 121 and the third terminal 122 of the choke 12 and second ends of the coils of the first differential-mode choke $L_{DM}$ are electrically coupled to the first terminal 120 of the choke 12. In summary, second coil ends of one of the first common-mode choke and the first differential-mode choke are electrically coupled to the first terminal of the choke, and second coil ends of the other are respectively electrically coupled to the second terminal and the at least one third terminal of the choke.

As a part of the choke 12 inserted between the AC power source and both of the first power conversion circuit 10 and the second power conversion circuit 11, the first common-mode choke $L_{CM}$ is useful for suppression of common-mode currents flowing to the apparatus 1 from the AC power source, while passing the differential-mode currents. The first differential-mode chock $L_{DM}$ has a group of coils wound on a core, and the number of the coils depends on the number of the first power conversion circuit 10 and the second power conversion circuit 11. In this embodiment, the apparatus 1 has one first power conversion circuit 10 and one second power conversion circuit 11, and consequently the number of the coils counts two. As a part of the choke 12 inserted between the AC power source and both of the first power conversion circuit 10 and the second power conversion circuit 11, the first differential-mode choke $L_{CM}$ is useful for suppression of differential-mode currents flowing within the apparatus 1, while passing the common-mode currents flowing from the AC power source.

Figure 2:
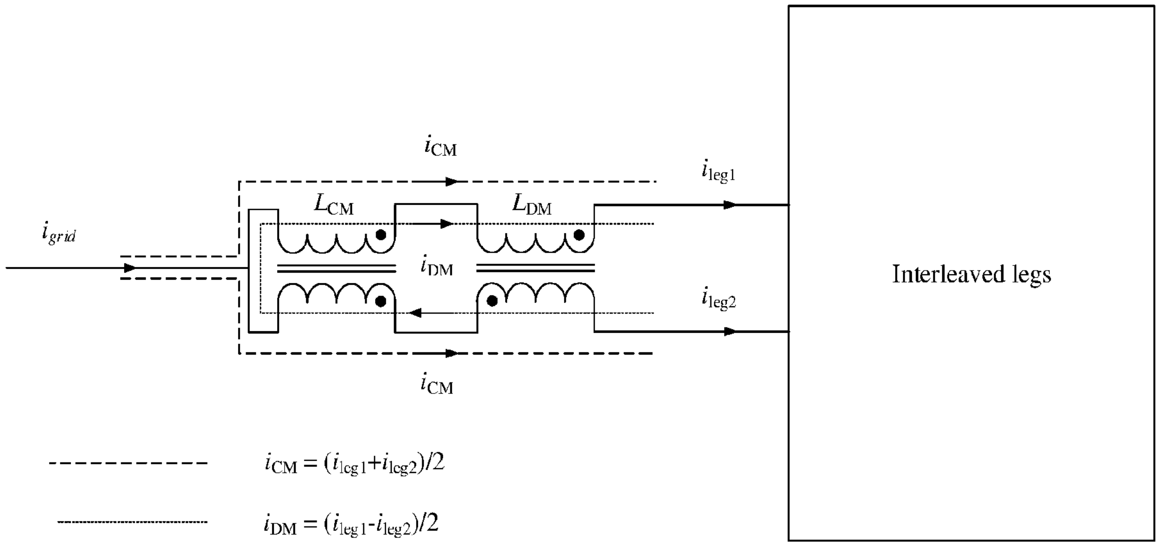
FIG. 2 illustrates phase current flow analysis of the choke according to an embodiment of present invention.

FIG. 2 illustrates phase current flow analysis of the choke according to an embodiment of present invention. $i_{grid}$ is the phase current of the AC source power. $i_{CM}$ is the common-mode current of the interleaved legs, which can be expressed as, $$i_{CM}=(i_{leg1}+i_{leg2})/2 \quad (1)$$

$i_{DM}$ is the differential-mode current of the interleaved legs, which can be expressed as, $$i_{DM}=(i_{leg1}+i_{leg2})/2 \quad (2)$$

The leg currents and grid current can be expressed as:

$$i_{leg1}=i_{CM}+i_{DM} \quad (3)$$

$$i_{leg2}=i_{CM}-i_{DM} \quad (4)$$

$$i_{grid}=i_{leg1}+i_{leg2}=2i_{CM} \quad (5)$$

For example, the leg consisting of diodes Da1, Da2 of the first power conversion circuit 10 and the leg consisting of diodes Da3, Da4 of the second power conversion circuit 11 are interleaved (phase A), the leg consisting of diodes Db1, Db2 of the first power conversion circuit 10 and the leg consisting of diodes Db3, Db4 of the second power conversion circuit 11 are interleaved (phase B), and the leg consisting of diodes Dc1, Dc2 of the first power conversion circuit 10 and the leg consisting of diodes Dc3, Dc4 of the second power conversion circuit 11 are interleaved (phase C).

As shown by the equation (3) and (4), the leg currents $i_{leg1}$ and $i_{leg2}$ consist of common-mode current $i_{CM}$ and differential-mode current $i_{DM}$. The equation (5) shows the common-mode current flows from the AC power source and its fundamental component is the useful component for power conversion. The differential-mode current does not go through the AC power source and has no contribution to power conversion, but increasing current ripples and power losses in inductors, so the differential-mode current is the undesired component.

The common-mode choke $L_{CM}$ and the differential-mode choke $L_{DM}$ are used together to pass the useful common-mode current and choke the undesired differential-mode current.

For the common-mode current component

By appropriately designing the inductance of the common-mode choke $L_{CM}$, the common-mode choke $L_{CM}$ provides high inductance to the high-frequency components of the common-mode current, which flows from the AC power source, since the impedance of the common-mode choke and the differential-mode choke depends on frequency on the same scale as inductance. The advantages of using the common-mode choke $L_{CM}$ is that it provides twice the inductance of separate inductor design due to the coupling effect. Therefore it filters the common-mode current more effectively or the inductance size can be reduced for a given current ripple requirement.

The differential-mode choke $L_{DM}$ gives no inductance towards the common-mode current due to the flux cancellation effect except the leakage inductance.

The common-mode choke $L_{CM}$, in principle, does not provide inductance towards the differential-mode current between the interleaved legs due to the flux cancellation effect. However, the leakage inductance and capacitance of $L_{CM}$ is acting in suppressing the differential-mode current between the interleaved legs together with the differential-mode choke $L_{DM}$. The leakage inductance and capacitance of the common-mode choke $L_{CM}$ help to reduce the undesired differential-mode current ripple and spikes.

For the differential-mode current component

The differential-mode choke $L_{DM}$ provides inductance to undesired differential-mode current. The inductance is doubled compared with separate inductor design due to the coupling effect. Therefore it suppress the differential-mode current between the interleaved legs more effectively.

Figure 3A:
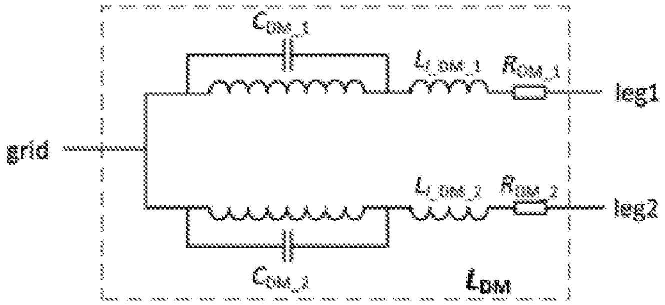
FIG. 3A illustrates a simplified high frequency equivalent circuit of using only differential-mode choke.

FIG. 3A illustrates a simplified high frequency equivalent circuit of using only differential-mode choke. The total parasitic capacitance ($C_{DM\_only}$) and leakage inductance ($L_{l\_Dm\_only}$) in this case are:

$$C_{DM\_only}=1/(1/C_{DM\_1}+1/C_{DM\_2}) \quad (6)$$

$$L_{l\_DM\_only}=L_{l\_DM\_1}+L_{l\_DM\_2} \quad (7)$$

The first common-mode choke $L_{CM}$ has a first parasitic capacitive element, and the first differential-mode choke $L_{DM}$ has a second parasitic capacitive element.

Figure 3B:
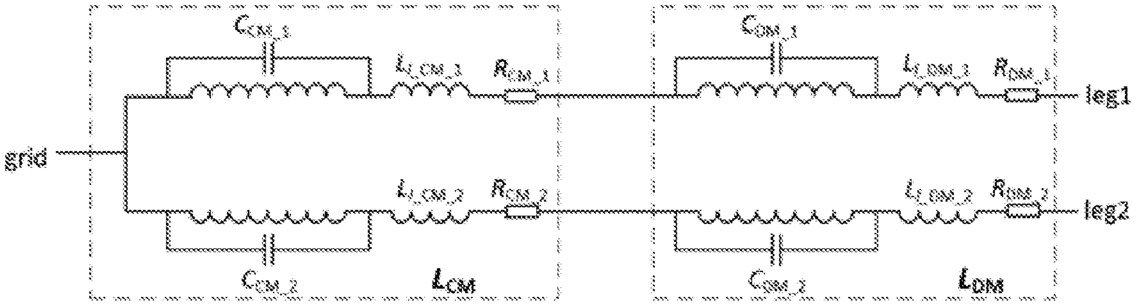
FIG. 3B shows the high frequency equivalent circuit of using common-mode choke and differential-mode choke according to an embodiment of present invention.

FIG. 3B shows the high frequency equivalent circuit of using common-mode choke and differential-mode choke according to an embodiment of present invention. The total parasitic capacitance ($C_{CM+DM}$) and leakage inductance ($L_{l\_CM+DM}$) in this case are, $$C_{CM+DM}=1/(1/C_{CM\_1}+1/C_{CM\_2}+1/C_{DM\_1}+1/C_{DM\_2})<C_{DM\_only} \quad (8)$$

$$L_{l\_CM+DM}=(L_{l\_CM\_1}+L_{l\_CM\_2}+L_{l\_DM\_1}+L_{l\_DM\_2})>L_{l\_DM\_only} \quad (9)$$

By using the combination of the common-mode choke $L_{CM}$ and the differential-mode choke $L_{DM}$, the following merits can be achieved:

- The common-mode current at high frequency flowing to the AC power source is chocked and the undesired differential-mode current is choked.
- Smaller inductances for both common-mode choke $L_{CM}$ and the differential-mode choke $L_{DM}$ are achieved due to the flux coupling effect.
- The leakage inductance of the common-mode choke ($L_{l\_CM\_1}+L_{l\_CM\_2}$) can contribute to suppressing the differential-mode current together with the differential-mode choke $L_{DM}$, leading to smaller differential-mode current or smaller differential-mode choke for a given differential mode current.
- The total parasitic capacitance $C_{CM+DM}$ (as shown in equation (8)) of the embodiment is smaller than the capacitance where an inductor is used instead. The total leakage inductance $L_{l\_CM+DM}$ (as shown in equation (9)) is larger than the leakage inductance where an inductor is used instead. The smaller parasitic capacitance and larger leakage inductance of the embodiment can lead to the reduction in current spikes when step voltage change occurs between the interleaved legs. The reduction in current spikes will contribute to better EMI performance.

Figure 4:
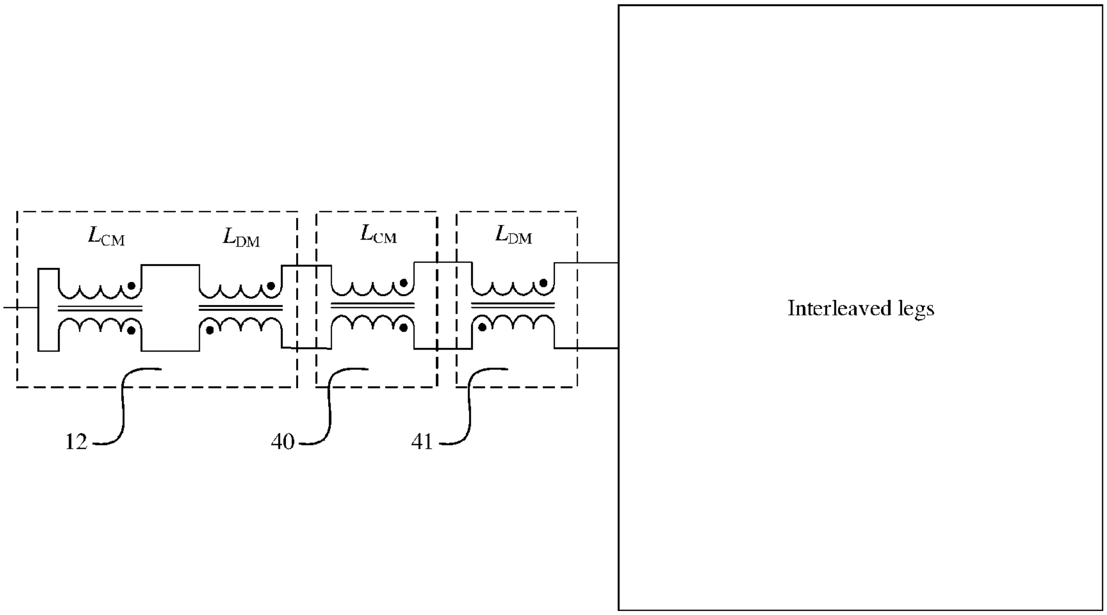
FIG. 4 illustrates an apparatus for conversion between AC power and DC power according to another embodiment of present invention.

FIG. 4 illustrates an apparatus for conversion between AC power and DC power according to another embodiment of present invention. As compared with the embodiment of FIGS. 1A and 1B, the choke 12 further includes at least one second common-mode choke 40 being electrically coupled to the first common-mode choke $L_{CM}$ and the first differential-mode choke $L_{DM}$ in series. Preferably, the choke 12 further includes at least one second differential-mode choke 41 being electrically coupled to the first common-mode choke $L_{CM}$ and the first differential-mode choke $L_{DM}$ in series.

Figure 5:
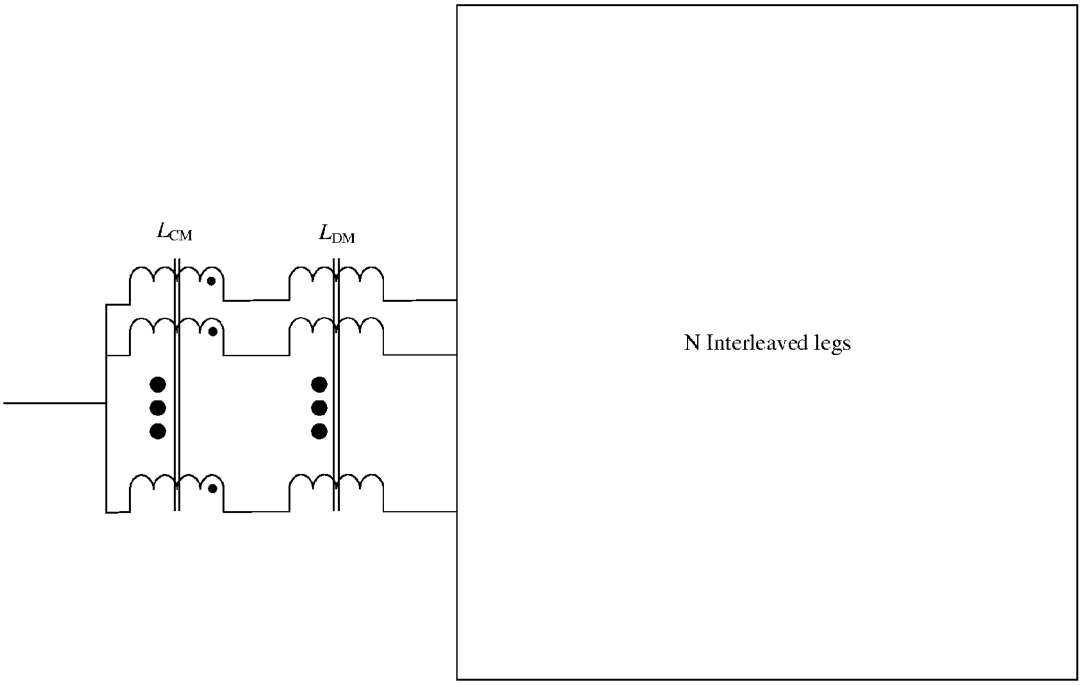
FIG. 5 illustrates an apparatus for conversion between AC power and DC power according to another embodiment of present invention.

FIG. 5 illustrates an apparatus for conversion between AC power and DC power according to another embodiment of present invention. As compared with the embodiment of FIGS. 1A and 1B where for each of phases A, B, C, the apparatus 1 uses two interleaved legs of two power conversion circuits (the first power conversion circuit 10 and the second power conversion circuit 11), this embodiment for each phase has three or more interleaved legs of three or more power conversion circuits. For example, the number of the second power conversion circuit 11 counts two or more. Accordingly, the number of the third terminal of the choke 12 is two or more, the number of the coils counts three or more, and the number of the coils counts three or more. With, e.g., three or more legs the figure would translate to 6 or more diodes, respectively, and three or more bi-directional switches, respectively, etc. The greater the number of legs, the closer to samples of a sinusoid the switched voltage samples will be.

Figure 6A:
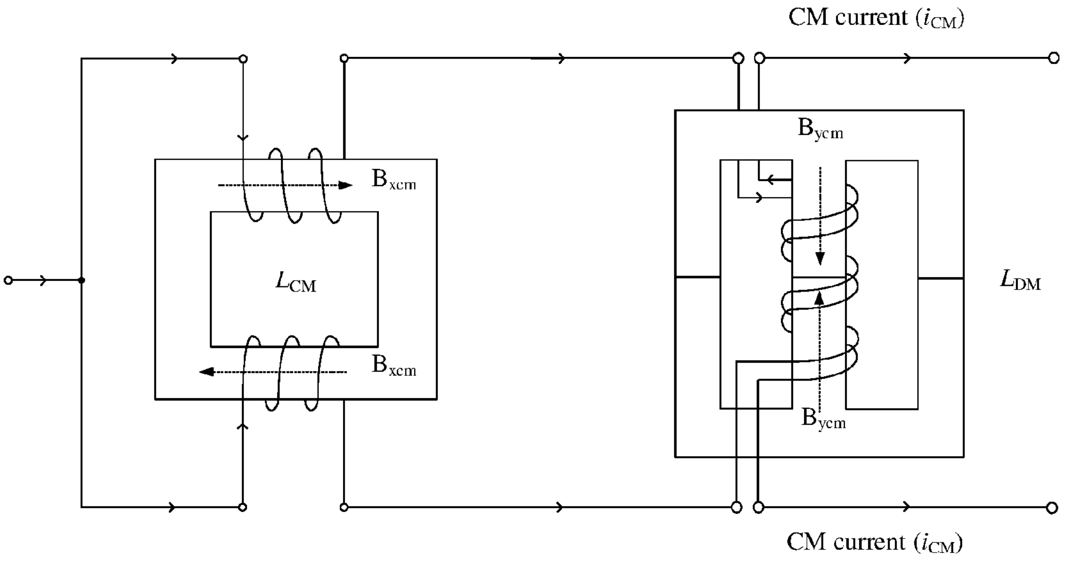
FIGS. 6A and 6B give first examples of the common-mode choke and the differential-mode choke.
Figure 6B:
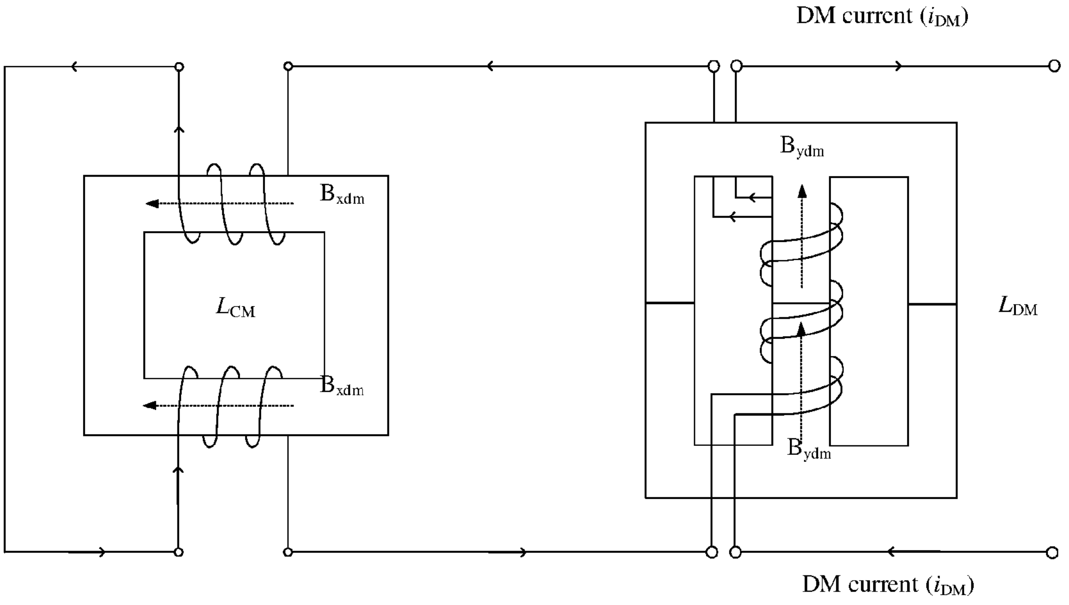

FIGS. 6A and 6B give a first example of the common-mode choke $L_{CM}$ and the differential-mode choke $L_{DM}$, as well as the flow of currents and fluxes in them. The two windings on the $L_{CM}$ have the same number of turns and are arranged in the way enhancing the flux generated by the Common-mode current and cancelling the flux generated by the Differential-mode current. The two windings on the $L_{DM}$ have the same number of turns and are arranged in the way cancelling the flux generated by the Common-mode current and enhancing the flux generated by the Differential-mode current. The flow of the Common-mode current ($i_{CM}$) and the corresponding fluxes are shown in FIG. 6A. The $B_{xcm}$ and $B_{ycm}$ denote the fluxes generated by the $i_{CM}$ in the $L_{CM}$ and $L_{DM}$ respectively. The $B_{xcm}$ enhance each other in the $L_{CM}$, while the $B_{ycm}$ cancel each other in the $L_{DM}$. The flow of the Differential-mode current ($i_{DM}$) and the corresponding fluxes are shown in FIG. 6B. The $B_{xdm}$ and $B_{ydm}$ denote the fluxes generated by the $i_{DM}$ in the $L_{CM}$ and $L_{DM}$ respectively. The $B_{xdm}$ cancel each other in the $L_{CM}$, while the $B_{ydm}$ enhance each other in the $L_{DM}$. In other words, Common-mode current just generates flux in $L_{CM}$ and does not generate flux in $L_{DM}$ in theory if without considering leakage inductance. Differential-mode current just generates flux in $L_{DM}$ and does not generate flux in $L_{CM}$ in theory if without considering leakage inductance. So the $L_{CM}$ handles the Common-mode current (which is also the grid current), and the $L_{DM}$ handles the Differential-mode current (which is also the circulating current).

Figure 7A:
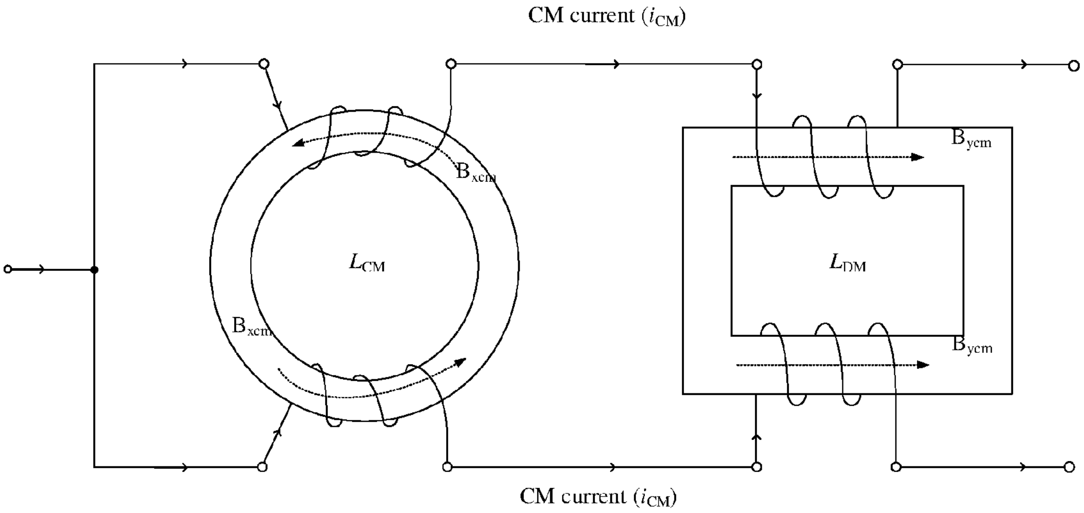
FIGS. 7A and 7B give another examples of the common-mode choke and the differential-mode choke.
Figure 7B:
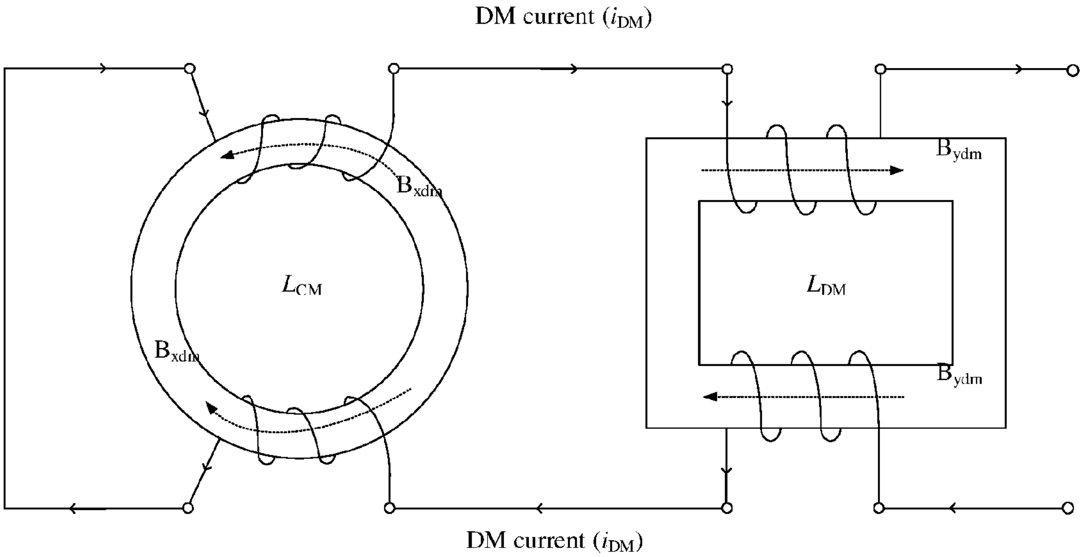

FIGS. 7A and 7B give another example of the $L_{CM}$ and $L_{DM}$ to show that the design of the $L_{CM}$ and $L_{DM}$ is very flexible and does not limit to a particular type. The current and flux analysis of the example in the FIGS. 7A and 7B is the same with the example in the FIGS. 6A and 6B, so it will not be repeated again.

The magnetic cores of the $L_{CM}$ and $L_{DM}$ could be the same or different, and do not limit to any certain material. For example, because $L_{DM}$ doesn't need to handle the grid current and the circulating current it handles is relatively small, ferrite that has the features of low power loss, high permeability and low saturation flux density could be used for $L_{DM}$ to achieve high inductance and low power loss. For $L_{CM}$, magnetic cores with relatively low permeability and high saturation flux density such as Fe—Si alloy could be used because the grid current it handles has relatively high current magnitude. The shape of the cores could be circular, rectangular, EI or double E, UU, PQ, and etc., and does not limit to any certain type for both $L_{CM}$ and $L_{DM}$, as shown in FIGS. 6A, 6B and FIGS. 7A, 7B.

Figure 8A:
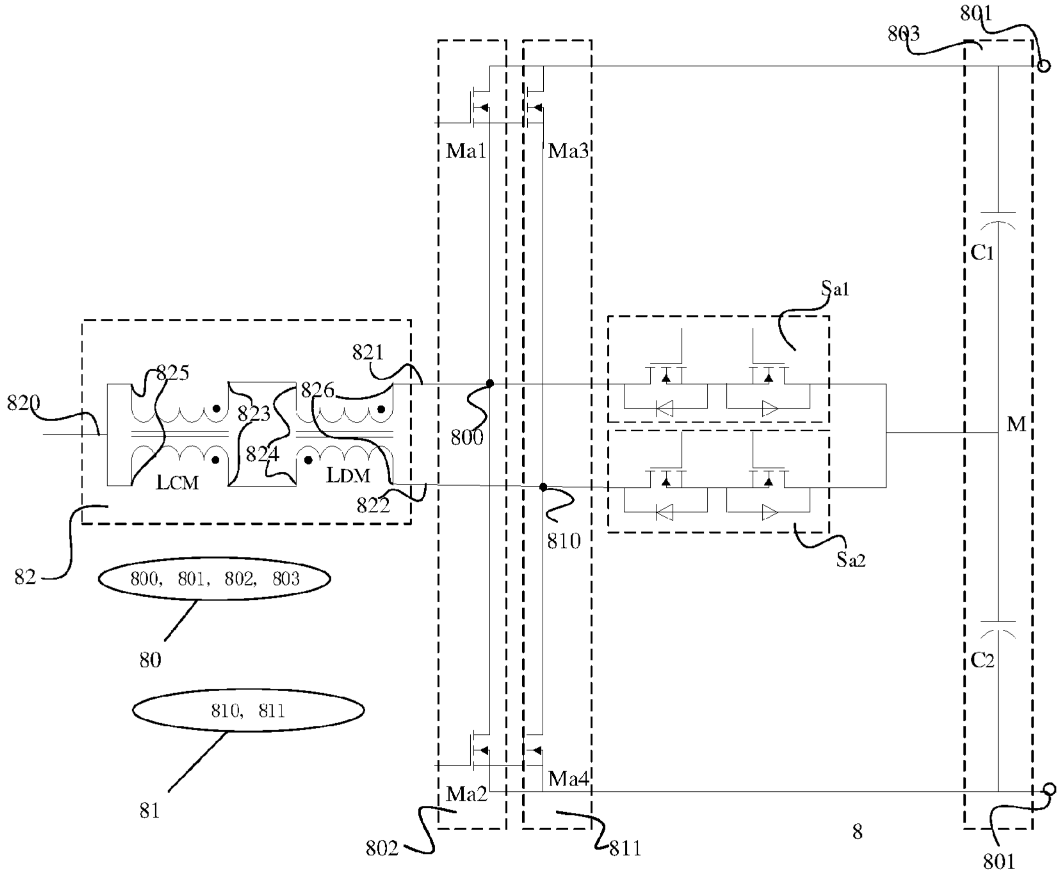
FIG. 8A shows another embodiment used for single phase AC power source according to present invention.
Figure 8B:
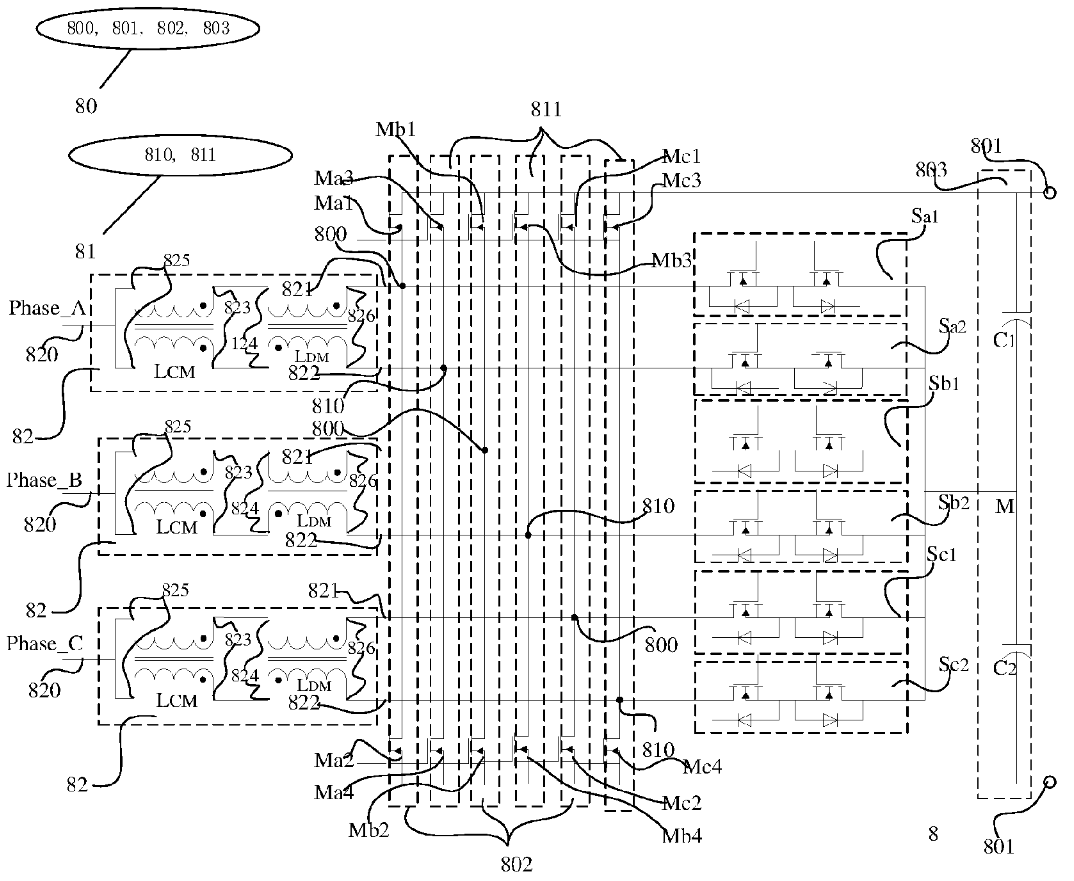
FIG. 8B shows another embodiment used for three phase AC power source according to present invention.

FIGS. 8A and 8B illustrate apparatuses for conversion between AC power and DC power according to another embodiment of present invention. FIG. 8A shows the embodiment used for single phase AC power source, and FIG. 8B shows the embodiment used for three phase AC power source. As shown in FIGS. 8A and 8B, the apparatus 8 can receive DC power at its DC side from a DC power source and convert the received DC power into AC power at its AC side. The apparatus 8 includes a first power conversion circuit 80, at least one second power conversion circuit 81, at least one choke 82.

The first power conversion circuit 80 can use a DC to AC power conversion topology having a first AC side 800 and a DC side 801. For example, the first power conversion circuit 80 may have a first inverter 802 and a capacitor bank 803. The first inverter 802 is coupled to the first AC side 800 and the capacitor bank 803 is coupled to the DC side 801. The first inverter 802 may invert a first DC power supplied from the DC power source, which in turn flows to the DC side 801 via the capacitor bank 803. As shown in FIG. 8A and different from FIG. 1A, the first inverter 802 includes a plurality of 3-terminal power semiconductor devices. A 3-terminal power semiconductor device has state dependent on not only its external power circuit to which it is connected, but also the signal on its driving terminal (normally known as gate or base). For example, the 3-terminal power semiconductor can be power MOSFET and IGBT. In this embodiment, MOSFETs Ma1-Ma2, arranged in a half bridge configuration. The mid-point for the MOSFETs Ma1-Ma2 is electrically coupled to one of the single phase terminals of the first AC side 800 of the first power conversion circuit 10. The legs consisting MOSFETs Ma1-Ma2 and MOSFETs Ma3-Ma4 are interleaved in operation under the controlling the controllable bi-directional switch Sa1 and the controllable bi-directional switch Sa2 by a controller. As shown in FIG. 8B, the first inverter 802 includes a plurality of MOSFETs Ma1-Ma2, Mb1-Mb2 and Mc1-Mc2, arranged in a three-phase full bridge configuration. The mid-points respectively for the MOSFETs Ma1-Ma2, MOSFETs Mb1-Mb2 and MOSFETs Mc1-Mc2 are electrically coupled to phase A, phase B and phase C of the first AC side 800 of the first power conversion circuit 80.

The at least one second power conversion circuit 81 each can use a DC to AC power conversion topology having a second AC side 810 and sharing the DC side 801 with the first power conversion circuit 80. In this embodiment, the number of the at least one second power conversion circuit 81 counts one. For example, the second power conversion circuit 81 may have a second inverter 811 is coupled to the second AC side 810, which may invert a second DC power supplied from the DC power source, which in turn flows to the DC side 801 via the capacitor bank 803. As shown in FIG. 8A, the second inverter 811 includes a plurality of MOSFETs Ma3-Ma4, arranged in a half bridge configuration. The mid-point for the MOSFETs Ma3-Ma4 is electrically coupled to the other of the single phase terminals of the first AC side 800 of the first power conversion circuit 80. As shown in FIG. 8B, the second inverter 811 includes a plurality of MOSFETs Ma3-Ma4, Db3-Db4 and Dc3-Dc4, arranged in a three-phase full bridge configuration. The mid-points respectively for the MOSFETs Ma3-Ma4, MOSFETs Mb3-Mb4 and MOSFETs Mc3-Mc4 are electrically coupled to phase A, phase B and phase C of the second AC side 810 of the second power conversion circuit 81. In this embodiment, the capacitor bank 803 has a first capacitive element C1 and a second capacitive element C2 electrically connected in series at a mid-point M. For each of the phases A, B, C, the apparatus 8 further includes: a group of controllable bi-directional switches, one of which is inserted between the second terminal 821 of the corresponding choke 82 and the mid-point M of capacitor bank 803 electrically connecting the same and the other of which is inserted between the third terminal 822 of the corresponding choke 82 and the mid-point M of capacitor bank 803 electrically connecting the same. For example, with respect to phase-A, the controllable bi-directional switch Sa1 is arranged between the second terminal 821 of the choke 82 for phase-A and the mid-point M of the capacitor bank 803, and the switch Sa1 electrically coupled to both of them; and the other controllable bi-directional switch Sa2 is arranged between the third terminal 822 of the choke 82 for phase-A and the mid-point M of the capacitor bank 803, and the switch Sa2 electrically coupled to both of them. The same holds true for phase B and phase C, except that for phase B it concerns with the counterparts as of the group of controllable bi-directional switches Sb1, Sb2 and the choke 82 for phase-B, and for phase C it concerns with the counterparts as of the group of controllable bi-directional switches Sc1, Sc2 and the choke 82 for phase-C. Modulation of the converter is the same as normal interleaved converter with phase shift between the two interleaved legs.

The number of the at least one choke 82 depends on how many phases the AC power source has which supplies AC current to the apparatus 1. In the embodiment of FIG. 8B, the AC power source has three phases A, B, C, thus the number of the at least one choke 82 counts three. Namely, for each phase A, B. C, there is arranged a choke in the apparatus 1. Each of the three chokes has a first terminal 820, a second terminal 821 and at least one third terminal 822. The number of the at least one third terminal 822 is associated with how many second power conversion circuit 81 the apparatus 8 uses. In this embodiment of FIG. 8A, the number of the at least one choke 82 counts one, and consequently a number of the at least one third terminal 822 counts one, as well.

The first terminal 820 of each of the three chokes 12 is arranged to be electrically coupled to a phase of the AC power, and the second terminal 821 and the third terminal 822 are electrically coupled to respective same phases of the first AC side 800 of the first power conversion circuit 80 and the second AC side 810 of the second power conversion circuit 81. As shown in FIG. 8A, the choke 82 has its first terminal 820 electrically coupled to one of the phase terminals of the AC power source, its second terminal 821 electrically coupled to the first AC side 800, and its third terminal 822 electrically coupled to the second AC side 810 of the second power conversion circuit 81. As shown in FIG. 8B, with respect to phase-A of the AC power source, one of the chokes 12 has its first terminal 820 coupled to the phase-A of the AC power source, its second terminal 821 electrically coupled to phase-A of the first AC side 800 of the first power conversion circuit 80, and its third terminal 822 electrically coupled to phase-A of the second AC side 810 of the second power conversion circuit 81; with respect to phase-B of the AC power source, one of the choke 82 has its first terminal 820 coupled to the phase-B of the AC power source, and its second terminal 821 electrically coupled to phase-B of the first AC side 800 of the first power conversion circuit 80 and its third terminal 822 electrically coupled to phase-B of the second AC side 810 of the second power conversion circuit 81; with respect to phase-C of the AC power source, one of the chokes 12 has its first terminal 820 is electrically coupled to the phase-C of the AC power source, its second terminal 821 electrically coupled to phase-C of the first AC side 800 of the first power conversion circuit 80, and its third terminal 822 electrically coupled to phase-C of the second AC side 810 of the second power conversion circuit 81.

Similar to the choke 12 according to FIGS. 1A and 1B, each choke 82 includes a first common-mode choke LCM and a first differential-mode choke LDM. The first common-mode chock LCM has a group of coils wound on a core, and the number of the coils depends on the number of the first power conversion circuit 80 and the second power conversion circuit 81. In this embodiment, the apparatus 8 has one first power conversion circuit 80 and one second power conversion circuit 81, and consequently the number of the coils counts two.

The first common-mode choke LCM and the first differential-mode choke LDM are electrically coupled in series via first ends 823 of the coils of the first common-mode choke LCM and first ends 824 of the coil of the first differential-mode choke LDM.

Second ends 825 of the coils of the first common-mode choke LCM are electrically coupled to the first terminal 820 of the choke 82, and second ends 826 of the coils of the first differential-mode choke LDM are respectively electrically coupled to the second terminal 821 and the third terminal 822 of the choke 82. As an alternative, second ends of the coils of the first common-mode choke LCM are respectively electrically coupled to the second terminal 821 and the third terminal 822 of the choke 82 and second ends of the coils of the first differential-mode choke LDM are electrically coupled to the first terminal 820 of the choke 82. In summary, second coil ends of one of the first common-mode choke and the first differential-mode choke are electrically coupled to the first terminal of the choke, and second coil ends of the other are respectively electrically coupled to the second terminal and the at least one third terminal of the choke.

As a part of the choke 82 inserted between the AC power source and both of the first power conversion circuit 80 and the second power conversion circuit 81, the first common-mode choke LCM is useful for suppression of common-mode currents flowing from the apparatus 8, while passing the differential-mode currents. The first differential-mode chock LDM has a group of coils wound on a core, and the number of the coils depends on the number of the first power conversion circuit 80 and the second power conversion circuit 81. In this embodiment, the apparatus 8 has one first power conversion circuit 80 and one second power conversion circuit 81, and consequently the number of the coils counts two. As a part of the choke 82 inserted between the AC power source and both of the first power conversion circuit 80 and the second power conversion circuit 81, the first differential-mode choke LCM is useful for suppression of differential-mode currents flowing within the apparatus 8, while passing the common-mode currents flowing from the apparatus 8.

Phase current flow analysis of the choke according to FIGS. 2, 3A, 3B may apply to the choke according to FIGS. 8A and 8B, except for the direction of the current igrid is reversed.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

What is claimed is:

1. An apparatus for conversion between AC power and DC power, including:

a first power conversion circuit having a first AC side and a DC side;

at least one second power conversion circuit each having a second AC side and sharing the DC side with the first power conversion circuit; and at least one choke having a first terminal, a second terminal and at least one third terminal, wherein the first terminal is arranged to be electrically coupled to a phase of the AC power, and the second terminal and the at least one third terminal are electrically coupled to respective same phases of the first AC side of the first power conversion circuit and the second AC side of the at least one second power conversion circuit;

wherein:

the choke includes:

a first common-mode choke; and a first differential-mode choke;

wherein:

the first common-mode choke and the first differential-mode choke are electrically coupled in series via a first group of coil ends of the first common-mode choke and a first group of coil ends of the first differential-mode choke; and a second group of coil ends of one of the first common-mode choke and the first differential-mode choke are electrically coupled to the first terminal of the choke, and a second group of coil ends of the other are respectively electrically coupled to the second terminal and the at least one third terminal of the choke.

2. The apparatus according to claim 1, further including:

a capacitor bank electrically coupled to the DC side, having a first capacitive element and a second capacitive element electrically connected in series at a mid-point.

3. The apparatus according to claim 2, further includes for each of the three phases:

a group of controllable bi-directional switches, one of which is inserted between the second terminal of the corresponding choke and the mid-point of capacitor bank electrically connecting the same and the other of which is inserted between the at least one third terminal of the corresponding choke and the mid-point of capacitor bank electrically connecting the same.

4. The apparatus according to claim 3, wherein:

the choke further includes:

at least one second common-mode choke, being electrically coupled to the first common-mode choke and the first differential-mode choke in series.

5. The apparatus according to claim 3, wherein:

the choke further includes:

at least one second differential-mode choke, being electrically coupled to the first common-mode choke and the first differential-mode choke in series.

6. The apparatus according to claim 3, wherein:

a number of the at least one second power conversion circuit counts one; and a number of the at least one third terminal counts one.

7. The apparatus according to claim 3, wherein:

the first common-mode choke has a first parasitic capacitive element; and the first differential-mode choke has a second parasitic capacitive element.

8. The apparatus according to claim 7, wherein:

the first common-mode choke has a leakage flux.

9. The apparatus according to claim 3, wherein:

the first power conversion circuit has a first rectifier electrically coupled to its first AC side; and the first power conversion circuit has a second rectifier electrically coupled to its second AC side.

10. The apparatus according to claim 3, wherein:

the first power conversion circuit has a plurality of 2-terminal power semiconductor devices; and the second power conversion circuit has a plurality of 2-terminal power semiconductor devices.

11. The apparatus according to claim 3, wherein:

the first power conversion circuit has a plurality of 3-terminal power semiconductor devices; and the second power conversion circuit has a plurality of 3-terminal power semiconductor devices.

12. The apparatus according to claim 2, wherein the choke further includes at least one second common-mode choke, being electrically coupled to the first common-mode choke and the first differential-mode choke in series.

13. The apparatus according to claim 1, wherein the choke further includes at least one second common-mode choke, being electrically coupled to the first common-mode choke and the first differential-mode choke in series.

14. The apparatus according to claim 1, wherein the choke further includes at least one second differential-mode choke, being electrically coupled to the first common-mode choke and the first differential-mode choke in series.

15. The apparatus according to claim 1, wherein a number of the at least one second power conversion circuit counts one; and a number of the at least one third terminal counts one.

16. The apparatus according to claim 1, wherein the first common-mode choke has a first parasitic capacitive element; and the first differential-mode choke has a second parasitic capacitive element.

17. The apparatus according to claim 16, wherein the first common-mode choke has a leakage flux.

18. The apparatus according to claim 1, wherein:

the first power conversion circuit has a first rectifier electrically coupled to its first AC side; and the first power conversion circuit has a second rectifier electrically coupled to its second AC side.

19. The apparatus according to claim 1, wherein:

the first power conversion circuit has a plurality of 2-terminal power semiconductor devices; and the second power conversion circuit has a plurality of 2-terminal power semiconductor devices.

20. The apparatus according to claim 1, wherein:

the first power conversion circuit has a plurality of 3-terminal power semiconductor devices; and the second power conversion circuit has a plurality of 3-terminal power semiconductor devices.

* * * * *